(12) United States Patent
Meijer

(10) Patent No.: US 8,024,704 B2
(45) Date of Patent: *Sep. 20, 2011

(54) SYSTEMS AND METHODS FOR EMPLOYING TAGGED TYPES IN A DYNAMIC RUNTIME ENVIRONMENT

(75) Inventor: Eric Meijer, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 1420 days.

This patent is subject to a terminal disclaimer.

(21) Appl. No.: 11/469,087

(22) Filed: Aug. 31, 2006

(65) Prior Publication Data

US 2007/0067372 A1   Mar. 22, 2007

Related U.S. Application Data

(63) Continuation of application No. 10/458,460, filed on Jun. 10, 2003, now Pat. No. 7,168,063.

(51) Int. Cl.
*G06F 9/44* (2006.01)
*G06F 9/45* (2006.01)

(52) U.S. Cl. ......... 717/116; 717/114; 717/118; 717/148

(58) Field of Classification Search ................. 717/116, 717/118, 153, 114, 148
See application file for complete search history.

(56) References Cited

U.S. PATENT DOCUMENTS

| | | | | |
|---|---|---|---|---|
| 5,519,868 | A * | 5/1996 | Allen et al. | 717/169 |
| 6,760,913 | B1 * | 7/2004 | Bailey et al. | 719/316 |
| 6,834,301 | B1 * | 12/2004 | Hanchett | 709/223 |
| 7,496,892 | B2 * | 2/2009 | Nuss | 717/114 |

OTHER PUBLICATIONS

Snyder et al. (Encapsulation and inheritance in object-oriented programming languages, OOPLSA '86 Conference proceedings on Object-oriented programming systems, languages and applications, 1986).*

CN OA dated Nov. 28, 2008 for CN Application Serial No. 200410048902.9, 9 pages.

"3.9 Tagged Types and Type Extensions," http://www.adaic.org/standards/95lrm/html/RM-3-9.html, last viewed on Sep. 22, 2003, 3 pages.

Pedro De Las Heras Quiros, et al., "Toward Protected Tagged Types in Ada 95," Department of Computer Science, Carlos III University, Madrid, Spain, Nov. 20, 1995, 9 pages.

Erik Meijer and Jim Miller, "Technical Overview of the Common Language Runtime (or why the JVM is not my favorite execution environment)," Jun. 8, 2001, 16 pages.

(Continued)

*Primary Examiner* — Li Zhen
*Assistant Examiner* — Hang Pan
(74) *Attorney, Agent, or Firm* — Workman Nydegger

(57) ABSTRACT

The present invention relates to systems and methods that facilitate dynamic programming language execution in a managed code environment. A class component is provided that declares an inheritance hierarchy for one or more tagged values associated with a dynamic programming language. During execution of the tagged values, a rules component mitigates user-defined types from inheriting or deriving properties from the tagged values in order to support a type safe runtime environment. A bifurcated class tree is provided that defines non-tagged type elements on one side of the tree and tagged type element values on an alternate branch of the tree. The rules component analyzes runtime extensions that help to prevent data from one component of the tree deriving or inheriting properties from another component of the tree. The runtime extensions include such aspects as cast class extensions, test class extensions, and conversion class extensions for converting data types from one class subtype to another.

20 Claims, 11 Drawing Sheets

OTHER PUBLICATIONS

Yutaka Oiwa, et al., "Extending Java Virtual Machine with Integer-Reference Conversion," University of Tokyo, 2000, 16 pages.

Olin Shivers, "Supporting dynamic languages on the Java virtual machine," MIT Artificial Intelligence Laboratory, Apr. 25, 1996, 6 pages.

G. Milasinovic, European Search Report, Munich, Apr. 1, 2005, 1 page.

Yutaka Oiwa, Kenjiro Taura, Akinori Yonezawa, "Extending Java Virtual Machine with Integer-Reference Conversion", University of Tokyo, May 2000.

* cited by examiner

SYSTEMS AND METHODS FOR EMPLOYING TAGGED TYPES IN A DYNAMIC RUNTIME ENVIRONMENT

CROSS-REFERENCE TO RELATED APPLICATIONS

This application is a continuation of U.S. patent application Ser. No. 10/458,460 filed Jun. 10, 2003, entitled "SYSTEMS AND METHODS FOR EMPLOYING TAGGED TYPES IN A DYNAMIC RUNTIME ENVIRONMENT". The entirety of this application is incorporated herein by reference.

TECHNICAL FIELD

The present invention relates generally to computer systems, and more particularly, to systems and methods that facilitate operations and execution of dynamic languages in a dynamic runtime environment.

BACKGROUND OF THE INVENTION

As computer science has evolved, object oriented programming has become one of many familiar models designers and programmers utilize to implement functionality within computer systems. The object model generally is defined by a class structure that includes class members providing both methods and associated data elements belonging to the class. The class members thus provide/define desired functionality within a computer program, wherein an object is declared as an instance of a particular class. As is commonplace, objects often must exchange data and/or invoke other objects operating on the same platform and/or communicate with objects belonging to remote platforms. In order to communicate between objects, interface systems and standards have been developed to define how objects may communicate and/or interact with one another.

A familiar system for communicating and interfacing between objects is known as the Component Object Model (COM), wherein another similar system is referred to as the Common Object Request Brokers Architecture (CORBA). Still yet other communication interfaces may be defined in languages such as JAVA within an operating framework of a Java Virtual Machine, for example. As these and other systems have been developed however, two common object architectures or models generally have emerged and may generally be defined in terms of managed and unmanaged object systems, for example.

Managed objects may be allocated from a heap within a managed software environment and are generally not responsible for managing associated object lifetimes. Managed objects may be described in terms of a data type (e.g., metadata) and automatically collected (e.g., reclaimed) by a managed environment "garbage collector" that removes the object from memory when the object is no longer being accessed. In contrast, unmanaged objects may be allocated from a standard operating system heap, wherein the object itself is responsible for freeing memory it employs when references to the object no longer exist. This may be accomplished through well-known techniques such as reference counting, for example.

As described above, managed objects may be allocated from a managed heap and automatically garbage collected. In order to achieve this, references to managed objects are traced. When a last reference to an object is removed, the garbage collector reclaims the memory occupied by the object mitigating the need to reference count managed objects. Thus, a managed environment essentially handles reference counting internally. Tracing is possible within managed code because the managed environment keeps track of outstanding references that exist on an object. As each new object reference is declared within managed code, the managed environment adds the reference to a list of live references.

At any given time, the managed environment, rather than the object itself, is thus aware of live references that exist on a given object. As references fall out of scope or change value, the list of live references is updated, and as long as a reference remains within managed code, the managed environment is able to trace it. Along with the object lifetime issues described above, managed and unmanaged object systems generally differ in many other significant ways. These differences may include how the object systems provide object interfaces within the respective object systems, how data is structured and/or defined, and how errors and exceptions are handled, for example.

Relating to object execution environments, dynamic programming languages offer a variety of different code types from which to develop a plurality of applications. Dynamically typed languages such as Perl, Scheme, Ruby, Python, Smalltalk, and so forth, traditionally utilize various tagging schemes to overcome the overhead of allocating small (usually word-sized) objects on the heap, but still keeping the benefits of a uniform representation of values for parametric operations. For instance, assuming that pointers are aligned at 4-byte boundaries, a common technique is to use the least-significant bit of a 32-bit value to distinguish between a pointer and an immediate value. On Windows-based system, for example, one might consider setting two most significant bits to 1 since pointers are not supposed to point in the topmost memory segments.

It is apparent to many system architects however, that programs that employ such encodings (e.g., encodings to distinguish between pointers and integer values) are not verifiable when executed on a managed execution environment such as a Common Language Runtime or a Java Virtual Machine. Currently, one verifiable manner to achieve a uniform representation is to utilize boxing (e.g., boxing associates an integer with an object), however, operating on boxed values can be an order of a magnitude slower with respect to processor execution performance than working on the underlying value directly.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention relates to systems and methods for processing tagged type values generated from dynamic programming languages in a managed object environment. Tagged type values include specially encoded portions of data such as a least significant bit of a 32-bit value enabling an execution engine to distinguish between a pointer and an immediate data value, for example. The present invention defines an abstract root type class for dynamic programming languages that are executable in a managed object environment such as provided by a virtual machine. This type class is defined as having a top portion in a class hierarchy that represents opaque, natural size values for data elements defined below the top portion of the class.

In one case, a bifurcated tree is developed below the top portion or root of the class, wherein a system object hierarchy (e.g., non-tagged elements) is developed on one side of the tree and a sealed type representing tagged values on the other side of the tree. Various rules are then applied to the abstract root type class to facilitate proper execution of dynamic programming languages that employ tagged types (e.g., seal or prevent data access from user-defined types to tagged types). More particularly, the execution rules mitigate values or data associated with user-defined types from deriving properties or inheriting from tagged members of the abstract class. In this manner, tagged type values can be executed in type safe execution environment. Also, by defining an abstract class and limiting access to members of the class, code execution performance is enhanced over conventional algorithms that employ tagged values such as via boxing protocols as described above.

According to one aspect of the present invention, elements of type tagged and elements of type top are defined, wherein top defines the uppermost member of a tree having data subtypes of tagged in one branch of the tree and data subtypes relating to non-tagged members in another branch of the tree. Metadata rules are then extended to help ensure that members of the non-tagged branches do not derive or inherit properties from the tagged subtypes or from the elements of type top. Rules can also be extended to support such operations as applying arithmetic or other type operations to tagged values. The rules can be applied during stack execution procedures and include such operations as casting an object to a top element type and/or tagged type. This can also include test operations to determine whether or not a value is a member of a respective class or subtype. Other execution rules include converting one type of data (e.g., integer) to a tagged type and visa versa. By defining an abstract class that encompasses both tagged and non-tagged values, and providing rules to isolate inheritance between class subtypes, the present invention provides a fast and safe environment for executing dynamic programming languages.

To the accomplishment of the foregoing and related ends, certain illustrative aspects of the invention are described herein in connection with the following description and the annexed drawings. These aspects are indicative of various ways in which the invention may be practiced, all of which are intended to be covered by the present invention. Other advantages and novel features of the invention may become apparent from the following detailed description of the invention when considered in conjunction with the drawings.

DETAILED DESCRIPTION OF THE INVENTION

The present invention relates to systems and methods that facilitate dynamic programming language execution in a managed code environment. A class component is provided that declares an inheritance hierarchy for one or more tagged values associated with a dynamic programming language. During execution of the tagged values, a rules component mitigates user-defined types from inheriting or deriving properties from the tagged values in order to support a type safe runtime environment. A bifurcated class tree is provided that defines non-tagged type elements on one side of the tree and tagged type element values on an alternate branch of the tree. The rules component analyzes runtime extensions that help to prevent data from one component of the tree deriving or inheriting properties from another component of the tree. The runtime extensions include such aspects as cast class extensions, test class extensions, and conversion class extensions for converting data types from one class subtype to another (e.g., convert tagged element to non-tagged element and visa versa).

As used in this application, the terms "component," "class," "hierarchy," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Figure 1:
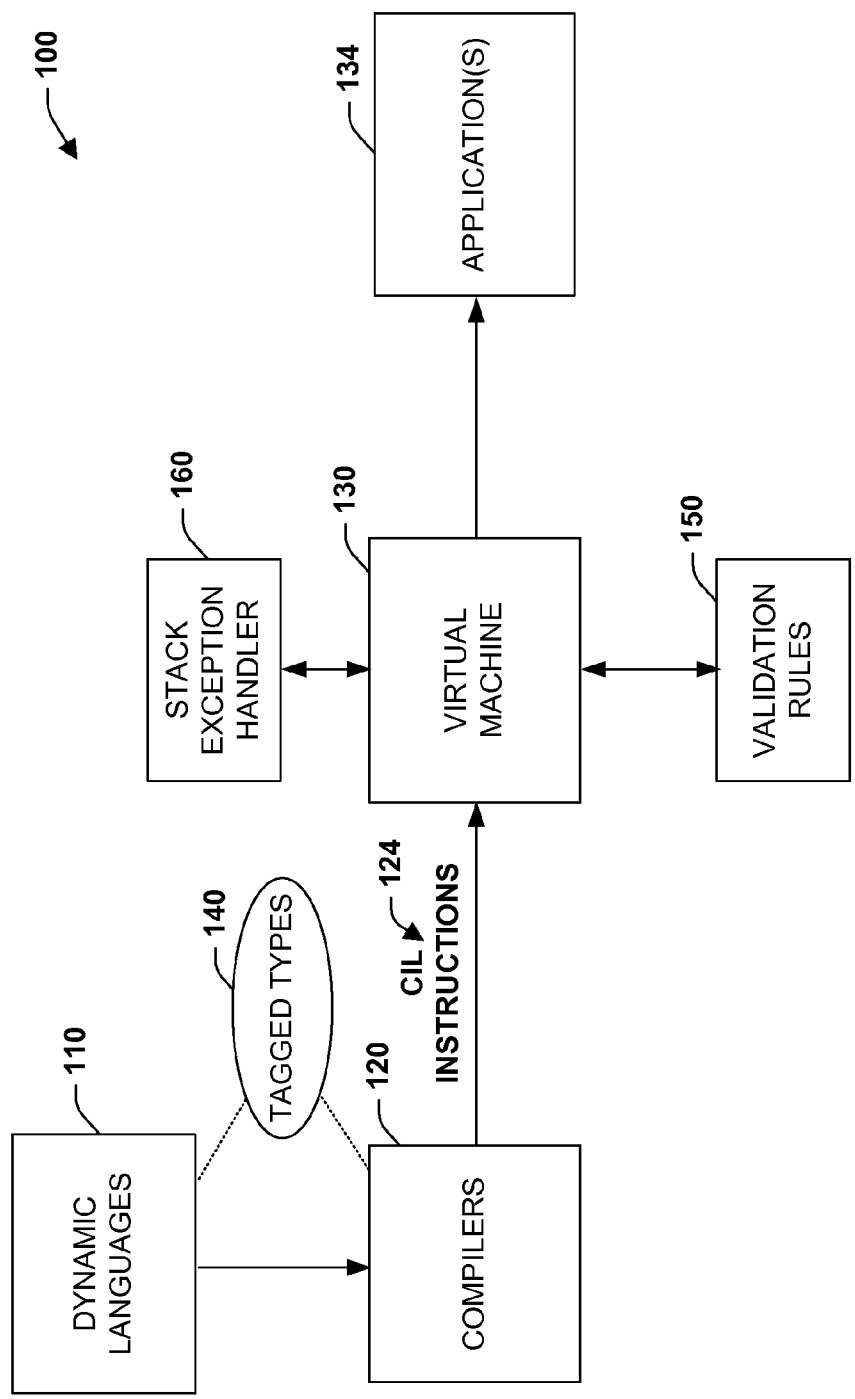
FIG. 1 is a schematic block diagram illustrating a tagged type processing system in accordance with an aspect of the present invention.

Referring initially to FIG. 1, a system 100 illustrates tagged type processing in accordance with an aspect of the present invention. One or more dynamic languages 110 are fed to a compiler 120 (e.g., Just in Time compiler) that generates intermediate language instructions 124 that are executed by a virtual machine 130. The dynamic languages 110 include substantially any type of computer language such as Perl, Scheme, Ruby, Python, and Smalltalk for example, that are compiled by the compiler 120 and executed by the virtual machine 130. Such machines can include a Virtual Execution System (VES), Common Language Runtime (CLR), or Java Virtual Machine, for example. When executing intermediate language code, the virtual machine 130 operates one or more computer applications 134 on single or multiple computer systems (can be local and/or remote networked systems). In one aspect of the present invention, the dynamic languages 110 declare and generate one or more tagged types 140 which are compiled and then executed on the virtual machine 130. The tagged types 140 represent encodings that distinguish pointer values from other values such as an immediate data value and are often employed by the dynamic languages 110.

The tagged types 140 are declared in a bifurcated class structure having tagged values on one side or root of the class structure and non-tagged or user-defined values in the other side or root, whereby this type class structure will be described in more detail below with respect to FIG. 2. In order to process the intermediate instructions 124 and tagged types 140, the virtual machine 130 and/or compiler 120 employ a set of validation rules 150 to help ensure that user-defined data types do not derive or inherit from tagged data types. Also, various stack execution rules 160 (described below) are modified and executed by a stack exception handler in order to process tagged and non-tagged values. By providing a new class type framework, validation rules 150, and/or stack exception handling 160, the present invention improves execution performance of the virtual machine 130. This is achieved by processing tagged values in accordance with a class framework and rules in lieu of and/or mitigating such techniques as treating tagged values as "boxed" variables. These variables are described in such standards as the "ECMA Standard" that defines the Common Language Infrastructure (CLI).

In general, the system 100 conforms with the ECMA Standard and Common Language Infrastructure (CLI) in which applications written in multiple high level languages may be executed in different system environments without the need to rewrite the application to take into consideration the unique characteristics of those environments. It is to be appreciated that other standards dealing with dynamic languages and/or virtual execution environments can be adapted in accordance with the present invention as well. The ECMA Standard consists of several sections which are readily available over the Internet in order to facilitate understanding various components by describing those components in their separate sections. These sections are:

Partition I: Architecture
Partition II: Metadata Definition and Semantics
Partition III: CIL Instruction Set
Partition IV: Profiles and Libraries
Partition V: Annexes The Common Language Infrastructure (CLI) provides a specification for executable code and the execution environment (the Virtual Execution System, or VES) in which it runs. Executable code is presented to the VES as modules. A module is typically a single file containing executable content in the format specified in. Generally, at the center of the Common Language Infrastructure (CLI) is a single type system, the Common Type System (CTS), that is shared by compilers, tools, and the CLI itself. It is the model that defines the rules the CLI follows when declaring, using, and managing types. The CTS establishes a framework that enables cross-language integration, type safety, and high performance code execution. The CLI includes the following basic components:

Common Type System. The Common Type System (CTS) provides a rich type system that supports the types and operations found in many programming languages. The Common Type System is intended to support the complete implementation of a wide range of programming languages.

Metadata. The CLI uses metadata to describe and reference the types defined by the Common Type System. Metadata is stored ("persisted") in a way that is independent of any particular programming language. Thus, metadata provides a common interchange mechanism for use between tools (compilers, debuggers, etc.) as well as between these tools and the Virtual Execution System.

Common Language Specification. The Common Language Specification is an agreement between language designers and framework (class library) designers. It specifies a subset of the CTS Type System and a set of usage conventions. Languages provide their users the greatest ability to access frameworks by implementing at least those parts of the CTS that are part of the CLS. Similarly, frameworks will be most widely used if their publicly exposed aspects (classes, interfaces, methods, fields, etc.) use types that are part of the CLS and adhere to the CLS conventions.

Virtual Execution System. The Virtual Execution System implements and enforces the CTS model. The VES is responsible for loading and running programs written for the CLI. It provides the services needed to execute managed code and data, using the metadata to connect separately generated modules together at runtime (late binding).

Together, these aspects of the CLI form a unifying framework for designing, developing, deploying, and executing distributed components and applications. The appropriate subset of the Common Type System is available from each programming language that targets the CLI. Language-based tools communicate with each other and with the Virtual Execution System using metadata to define and reference the types used to construct the application. The Virtual Execution System uses the metadata to create instances of the types as needed and to provide data type information to other parts of the infrastructure (such as remoting services, assembly downloading, security, etc.).

Figure 2:
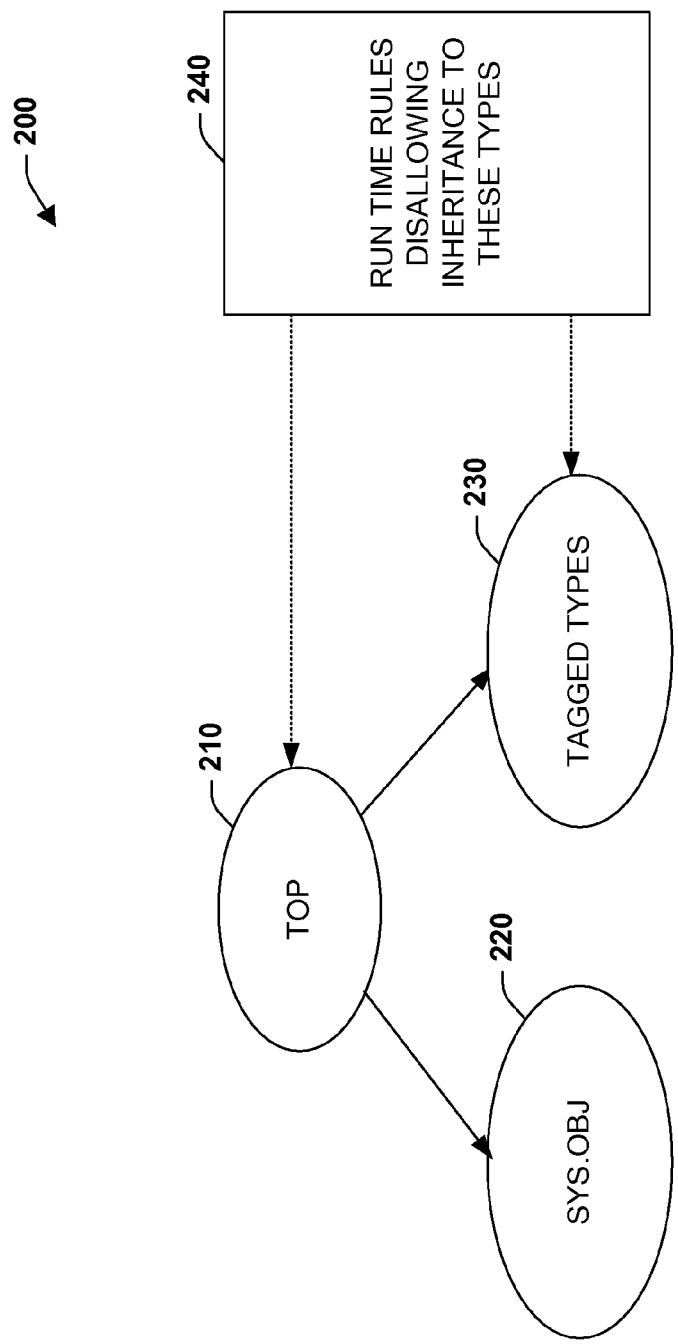
FIG. 2 is a block diagram illustrating a tagged type hierarchy in accordance with an aspect of the present invention.

Turning now to FIG. 2, a diagram 200 illustrates a tagged type hierarchy in accordance with an aspect of the present invention. To support tagged values in a type-safe way, the present invention provides a new (abstract) root type, noted as Top 210, to an inheritance hierarchy that represents opaque, natural size, values. Below this new root 210, an existing System.Object hierarchy 220 is declared on the one side and a (sealed) type Tagged 230 on the other side. The type Top 210 generally corresponds to the concept of object reference type O as provided in ECMA Partition III. The subject invention provides O into a first class type and adds a new subtype Tagged 230. At 240, one or more metadata validation rules are provided that disallow inheritance to elements defined as Top 210 and tagged types 230. These rules are described in more detail below. Also, it is to be appreciated that although two branches are depicted below the Top 210, other branches may be similarly provided (e.g., multiple branches defined beside or below System.Obj and tagged types).

Object references (type O) defined in ECMA Partition III are generally considered completely opaque. There are typically no arithmetic instructions that allow object references as operands although the present invention provides for arithmetic operations for tagged types as described below. Comparison operations permitted are equality (and inequality) between object references with the present invention providing test class instructions. There are no conversion operations defined on object references in ECMA Partition III, however, the present invention provides for conversions between tagged and non-tagged values. Object references are typically created by certain CIL object instructions (e.g., newobj and newarr). These references can also be passed as arguments, stored as local variables, returned as values, and stored in arrays and as fields of objects, for example.

The present invention also provides for explicit support for common runtime languages (CLR) which substantially facilitates employment of CLR as a true multi-language runtime. One particular aspect of the invention provides for addition of extensions (e.g., arithmetic operations, validation rules) to support dynamic languages as well (e.g., Open Source applications). The invention supports tagged values in a type-safe manner via employment of the abstract root type (e.g., Top) with an inheritance hierarchy that represents opaque, natural size, values. The invention mitigates conventional problems associated with the need to use various tagging schemes to overcome overhead of allocating small (e.g., word-sized) objects on a heap, but still maintain benefits of uniform representation of values for parametric operations, for example.

FIGS. 3-4, and 6-9 illustrate various methodologies in accordance with the present invention. While, for purposes of simplicity of explanation, the methodologies are shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Figure 3:
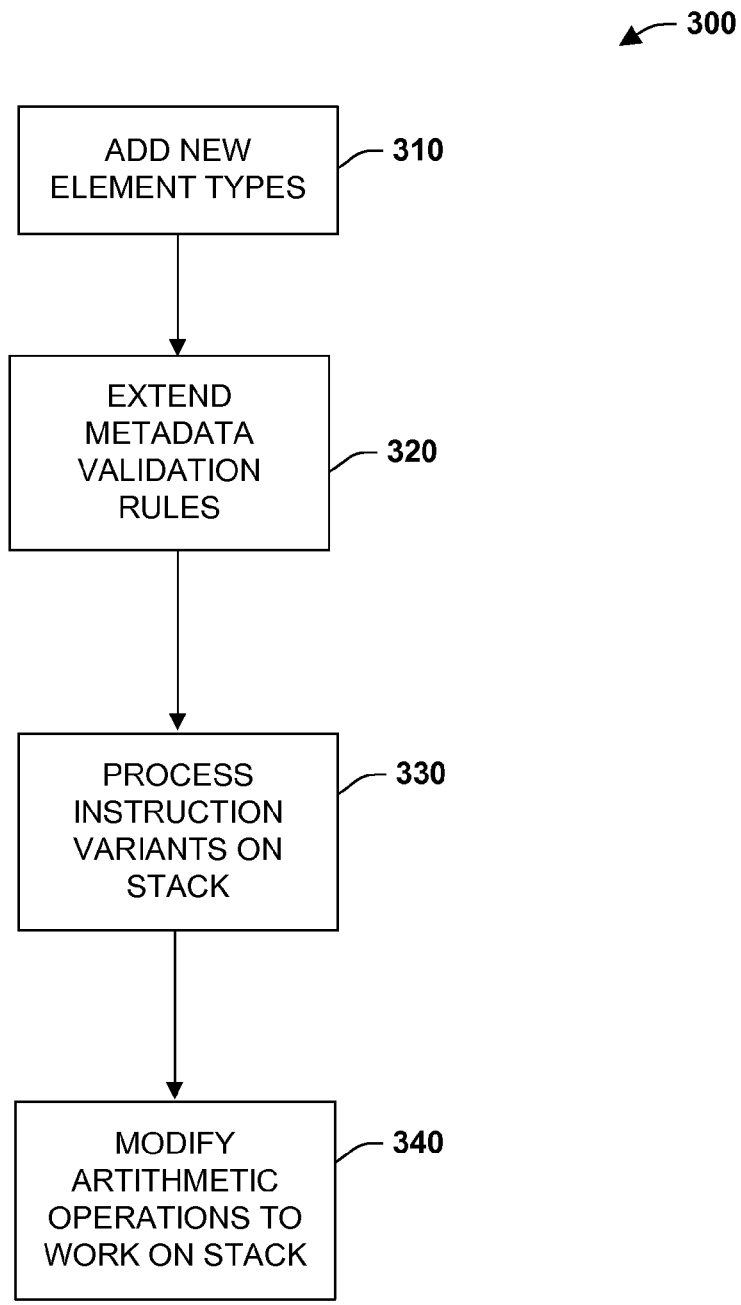
FIG. 3 is a flow diagram illustrating tagged type processing in accordance with an aspect of the present invention.

Referring now to FIG. 3, a diagram 300 illustrates tagged type processing in accordance with an aspect of the present invention. Before proceeding with 310 and 320, it is noted that these acts may be provided as a change to ECMA Partition II. At 310, at least two new element types ELEMENT_TYPE_TAGGED and ELEMENT_TYPE_TOP are defined as part of a hierarchical class structure for processing tagged values. At 320, metadata validation rules extended to ensure that user-defined types cannot derive from the TOP or TAGGED type elements. As noted above, the CLI employs metadata to describe and reference the types defined by the Common Type System. Metadata is stored ("persisted") in a way that is independent of particular programming languages. Thus, metadata provides a common interchange mechanism for use between tools that manipulate programs (compilers, debuggers, etc.) as well as between these tools and a Virtual Execution System. Metadata tokens typically describe a 4-byte value, that specifies a row in a metadata table, or a starting byte offset in a User String heap, for example.

Before proceeding, it is noted that the following may be provided as part of changes to ECMA Partition III. At 330, generally all instruction variants with a .ref suffix will load a value of type TOP on the stack in order to process tagged type values. At 340, in an alternative aspect of the present invention, arithmetic operations can be redefined to work on tagged values. In order to achieve this, tables in section 1.5 of Partition III can be extended (e.g., modify operands to operate on types TOP and TAG, extend validation rules during arithmetic operations). The following tables illustrate various instructions from ECMA Partition III that can be extended to operate on tagged type values.

TABLE 1

Binary Numeric Operations

| | B's Type | | | | | |
|---|---|---|---|---|---|---|
| A's Type | int32 | int64 | native int | F | & | O |
| int32 | int32 | x | native int | x |  | x |
| int64 | x | int64 | x | x | x | x |
| native int | native int | x | native int | x |  | x |
| F | x | x | x | F | x | x |

TABLE 1-continued

Binary Numeric Operations

| | B's Type | | | | | |
|---|---|---|---|---|---|---|
| A's Type | int32 | int64 | native int | F | & | O |
| & |  | x |  | x |  | x |
| O | x | x | x | x | x | x |

TABLE 2

Unary Numeric Operations

| Operand Type | int32 | int64 | native int | F | & | O |
|---|---|---|---|---|---|---|
| Result Type | int32 | int64 | native int | F | x | x |

TABLE 3

Binary Comparison or Branch Operations

| | int32 | int64 | native int | F | & | O |
|---|---|---|---|---|---|---|
| int32 | √ | x | √ | x | x | x |
| int64 | x | √ | x | x | x | x |
| native int | √ | x | √ | x |  | x |
| F | x | x | x | √ | x | x |
| & | x | x |  | x | √[1] | x |
| O | x | x | x | x | x | beq[.s], bne.un[.s], ceq[2] |

TABLE 4

Integer Operations

| | int32 | int64 | native int | F | & | O |
|---|---|---|---|---|---|---|
| int32 | int32 | x | native int | x | x | x |
| int64 | x | int64 | x | x | x | x |
| native int | native int | x | native int | x | x | x |
| F | x | x | x | x | x | x |
| & | x | x | x | x | x | x |
| O | x | x | x | x | x | x |

TABLE 5

Shift Operations

| | | Shift-By | | | | | |
|---|---|---|---|---|---|---|---|
| | | int32 | int64 | native int | F | & | O |
| To Be Shifted | int32 | int32 | x | int32 | x | x | x |
| | int64 | int64 | x | int64 | x | x | x |
| | native int | native int | x | native int | x | x | x |
| | F | x | x x | x | x | x | x |
| | & | x | x x | x | x | x | x |
| | O | x | x x | x | x | x | x |

TABLE 6

Overflow Arithmetic Operations

| | int32 | int64 | native int | F | & | O |
|---|---|---|---|---|---|---|
| int32 | int32 | x | native int | x | add.ovf | x |
| int64 | x | int64 | x | x | x | x |
| native int | native int | x | native int | x | add.ovf | x |
| F | x | x | x | x | x | x |
| & | add.ovf | x | add.ovf | x | sub.ovf | x |
| O | x | x | x | x | x | x |

TABLE 7

Conversion Operations

| | Input (from evaluation stack) | | | | | |
|---|---|---|---|---|---|---|
| Convert-To | int32 | int64 | native int | F | & | O |
| int8<br>unsigned int8<br>int16<br>unsigned int16 | Truncate | Truncate | Truncate | Truncate to zero$^2$ | x | x |
| int32<br>unsigned int32 | Nop | Truncate | Truncate | Truncate to zero | x | x |
| int64 | Sign extend | Nop | Sign extend | Truncate to zero | top of stack | top of stack |
| unsigned int64 | Zero extend | Nop | Zero extend | Truncate to zero | top of stack | top of stack |
| native int | Sign extend | Truncate | Nop | Truncate to zero | top of stack | top of stack |
| native unsigned int | Zero extend | Truncate | Nop | Truncate to zero | top of stack | top of stack |
| All Float Types | To Float | To Float | To Float | Change precision$^3$ | x | x |

Figure 4:
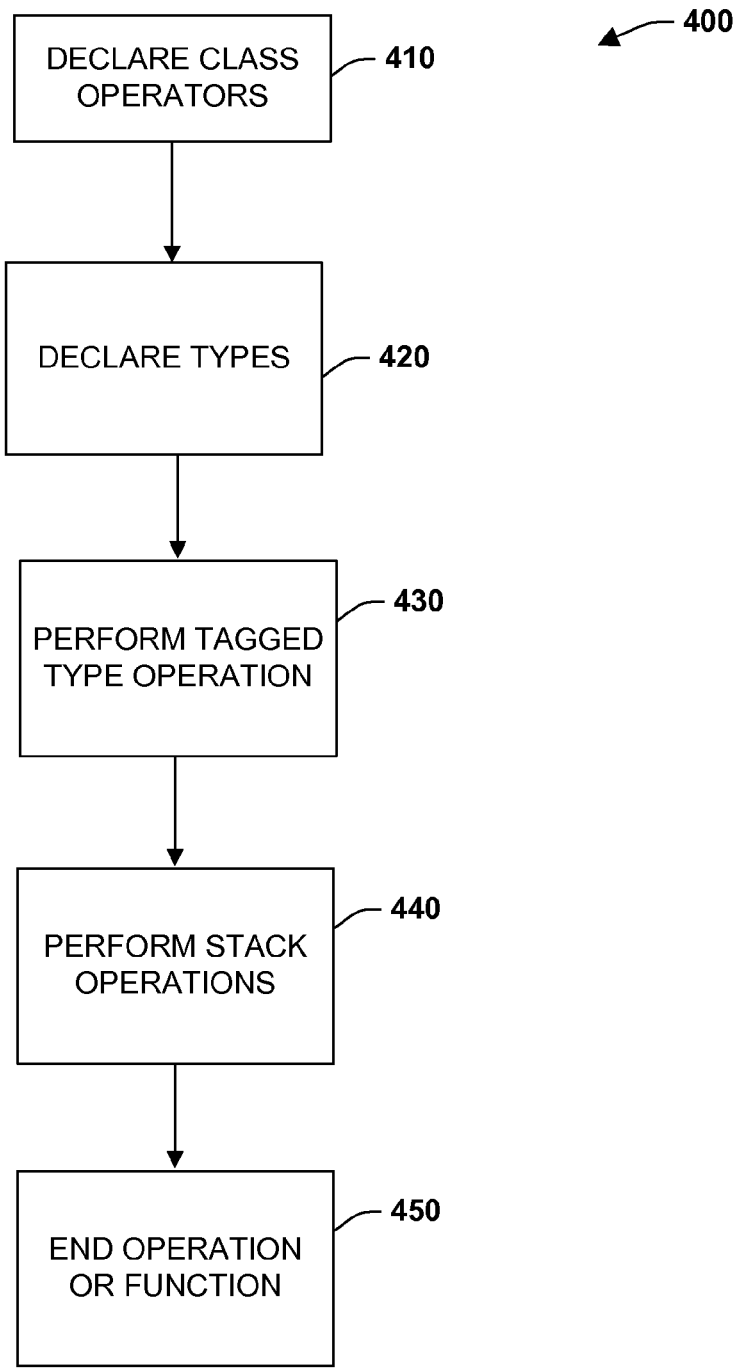
FIG. 4 is a flow diagram illustrating tagged type instruction execution in accordance with an aspect of the present invention.

Referring to FIG. 4, a diagram 400 illustrates an example of tagged type instruction execution in accordance with an aspect of the present invention. Although the instruction described below relates to an "add" instruction, it is to be appreciated that any of the instructions associated with the ECMA or other standards can be similarly extended and applied to tagged type processing or a combination of tagged and non-tagged processing. At 410, class or function elements are declared. For example, a list function having an add instruction (or other operand) may be written as:

```
List {
    Add (Top x);
At 420, tagged and non-tagged types can be declared, for example:
List {
    Add (Top x);
    private Top [ ] values;
    private (int, i);
At 430, tagged type operations are performed, for example:
List {
    Add (Top x);
    private Top [ ] values;
    private (int, i);
    Add (Top x) {
        values [i] = x;
```

-continued

```
        i = i + 1;
    }
```

Proceeding to 440, stack operations are performed before, during, and/or after tagged type processing. At 450, the tagged type operation or function ends. Thus, in this example, the final example list function may appear as:

```
List {
    Add (Top x);
    private Top [ ] values;
    private (int, i);
    Add (Top x) {
        values [i] = x;
        i = i + 1;
    }
}
```

Figure 5:
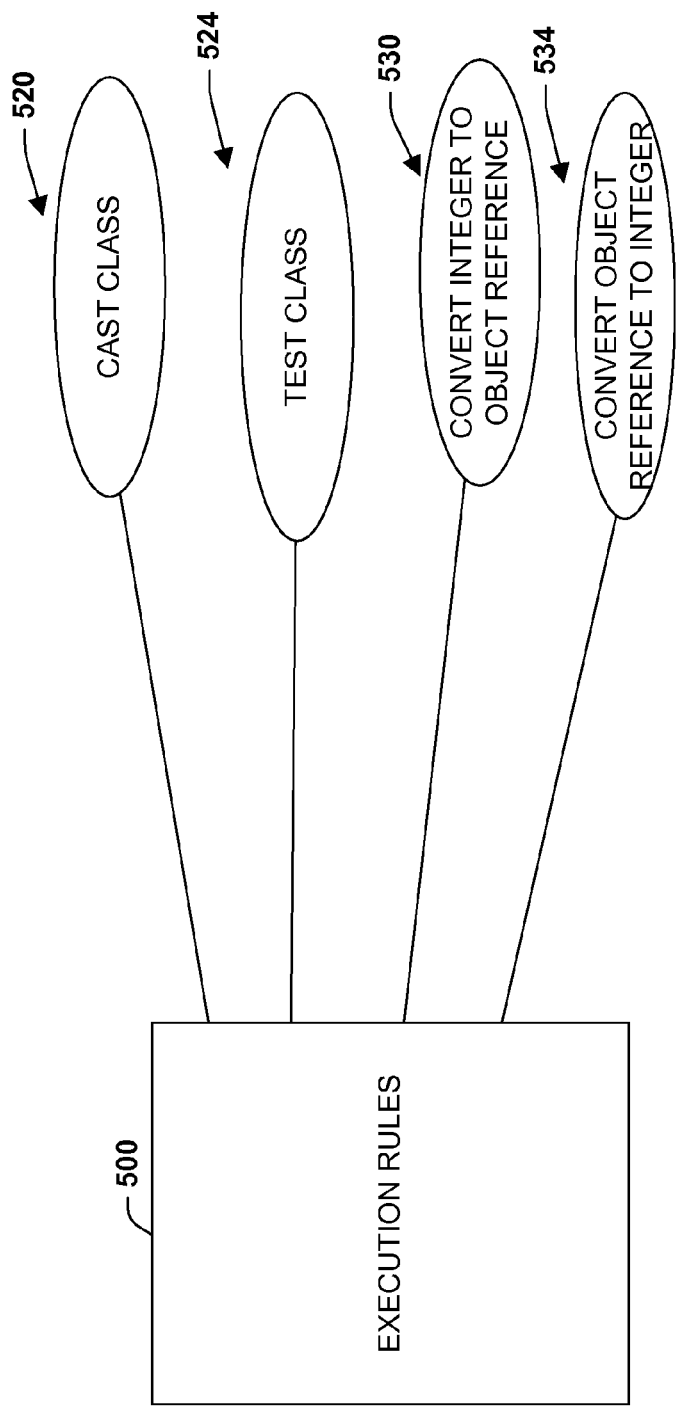
FIG. 5 illustrates execution rules in accordance with an aspect of the present invention.

FIG. 5 illustrates one or more execution rules 500 in accordance with an aspect of the present invention. In one aspect, a cast class instruction or rule can be provided at 520. This type of instruction casts an object to a class and is described in more detail below with respect to FIG. 6. In another aspect, a test class instruction or rule can be provided at 524. This type of instruction performs a test on an object to determine if an object is an instance of a class or interface and is described in more detail below with respect to FIG. 7. In yet another aspect, a convert integer to object reference instruction or rule can be provided at 530. This type of instruction (e.g., tag instruction) converts an integer value to an object reference and is described in more detail below with respect to FIG. 8. In still yet another aspect, a convert object reference to integer instruction or rule can be provided at 534. This type of instruction (e.g., untag instruction) converts an object reference to an integer value and is described in more detail below with respect to FIG. 9. It is to be appreciated that other instructions or rules can be similarly defined (e.g., arithmetic instructions).

Before proceeding with a discussion of FIGS. 6-9, the following is provided to describe stack concepts described therein.

Stack Transition Diagram

A stack transition diagram displays the state of the evaluation stack before and after an instruction is executed. Below is a typical stack transition diagram.

..., value1, value2→ ..., result

This example diagram indicates that the stack must have at least two elements on it, and in the definition the topmost value ("top of stack" or "most recently pushed") will be called value2 and the value underneath (pushed prior to value2) will be called value1. (In diagrams like this, the stack grows to the right, along the page). The instruction removes these values from the stack and replaces them by another value, called result in the description.

Figure 6:
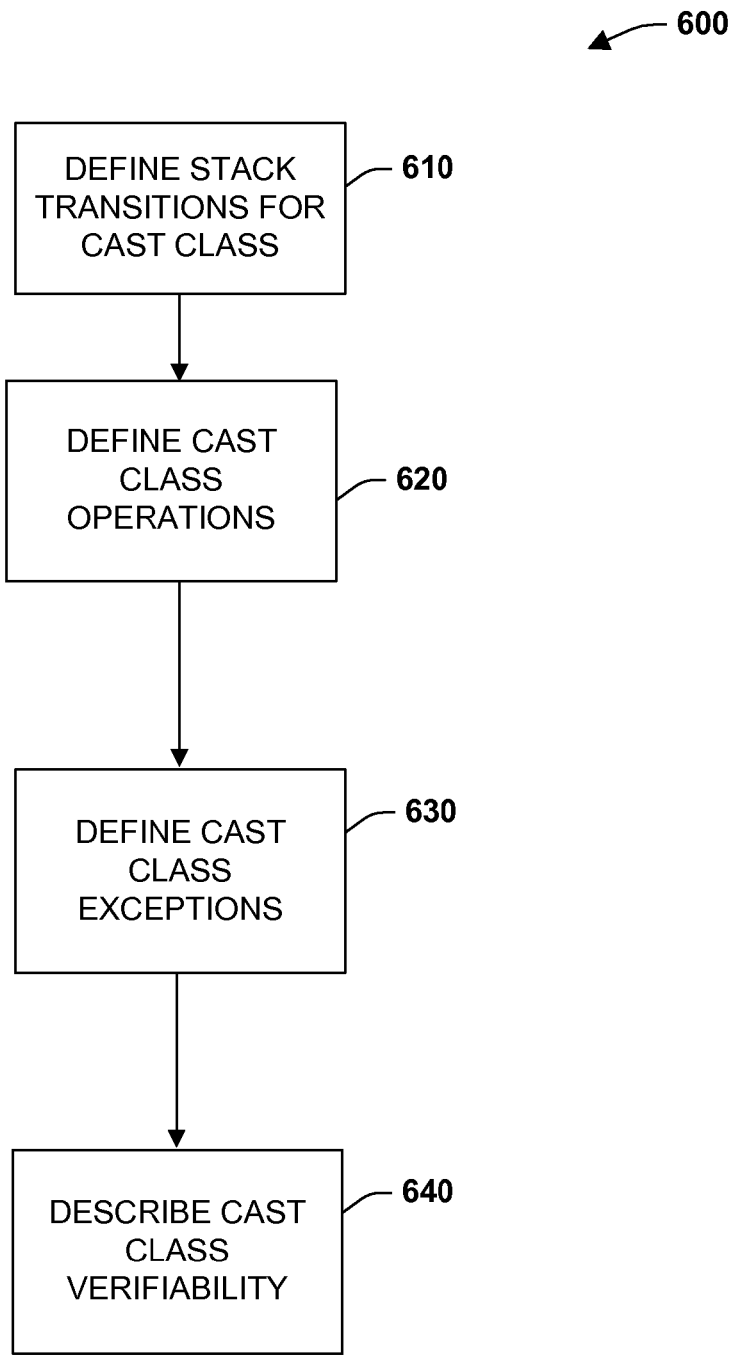
FIG. 6 is a flow diagram illustrating cast class rules in accordance with an aspect of the present invention.

FIG. 6 is a diagram 600 illustrating cast class rules in accordance with an aspect of the present invention.

| castclass - cast an object to a class | | |
|---|---|---|
| Format | Assembly Format | Description |
| 74 <T> | castclass class | Cast obj to class |

At 610, stack transitions are defined for cast class as follows:

Stack Transition:
..., obj→ ..., obj2

At 620, cast class is defined as follows wherein italicized items illustrate changes to ECMA partition III:

The castclass instruction attempts to cast an object (e.g., Top) to a class. Class is a metadata token (a typeref or typedef), indicating the desired class. If the object on top of the class is untagged and T is Tagged, then an invalid exception is thrown. If the class of the object on the top of the stack does not implement class (if class is an interface), and is not a subclass of class (if class is a regular class), then an InvalidCastException is thrown.

It is noted that:
1. Arrays inherit from System.Array
2. If Foo can be cast to Bar, then Foo[ ] can be cast to Bar[ ]
3. For the purposes of 2. above, enums are treated as their underlying type: thus E1[ ] can cast to E2[ ] if E1 and E2 share an underlying type If obj is null, castclass succeeds and returns null. This behavior differs from isInst described below.

At 630, Exceptions for cast class are described as follows:
InvalidCastException is thrown if obj cannot be cast to class.

TypeLoadException is thrown if class cannot be found. This is typically detected when CIL is converted to native code rather than at runtime.

At 640, Verifiability for a cast class is described:

Correct CIL ensures that class is a valid TypeRef or TypeDef token, and that obj is null, an object reference, or a tagged immediate value.

Figure 7:
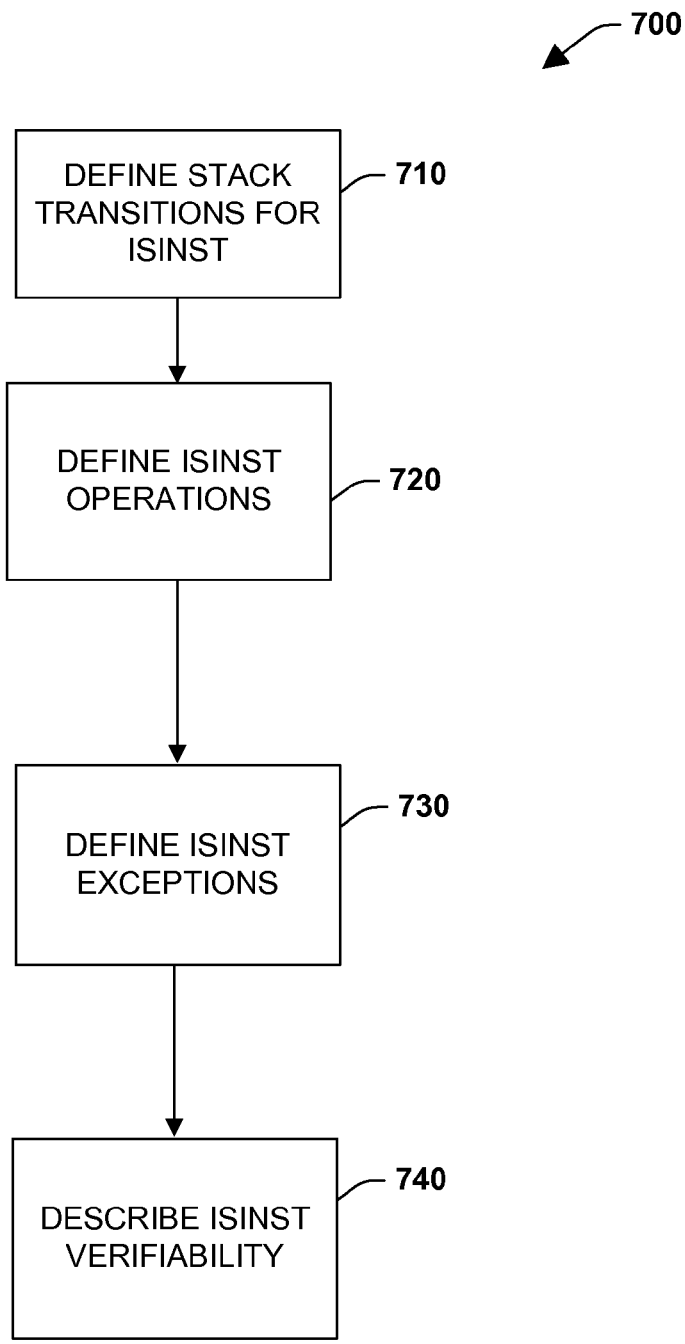
FIG. 7 is a flow diagram illustrating test class rules in accordance with an aspect of the present invention.

FIG. 7 is a diagram 700 illustrating test class rules in accordance with an aspect of the present invention.

| isinst - test if an object is an instance of a class or interface | | |
|---|---|---|
| Format | Assembly Format | Description |
| 75 <T> | isinst class | test if obj is an instance of class, returning NULL or an instance of that class or interface |

At 710, stack transitions are defined for cast class as follows:

Stack Transition:
..., obj→ ..., result

At 720, cast class is defined as follows wherein italicized items illustrate changes to ECMA partition III:

The isinst instruction tests whether obj (type Top) is an instance of class. Class is a metadata token (a typeref or typedef) indicating the desired class. If the object on top of the stack is untagged and T is Tagged, NULL is pushed on the stack. If the class of the object on the top of the stack implements class (if class is an interface) or is a subclass of class (if class is a regular class), then it is cast to the type class and the result is pushed on the stack—as though castclass had been called. Otherwise NULL is pushed on the stack. If obj is NULL, isinst returns NULL.

It is noted that:
1. Arrays inherit from System.Array
2. If Foo can be cast to Bar, then Foo[ ] can be cast to Bar[ ]
3. For the purposes of 2., enums are treated as their underlying type: thus E1[ ] can cast to E2[ ] if E1 and E2 share an underlying type At 730, Exceptions for test class are described as follows:
TypeLoadException is thrown if class cannot be found. This is typically detected when CIL is converted to native code rather than at runtime.

Figure 8:
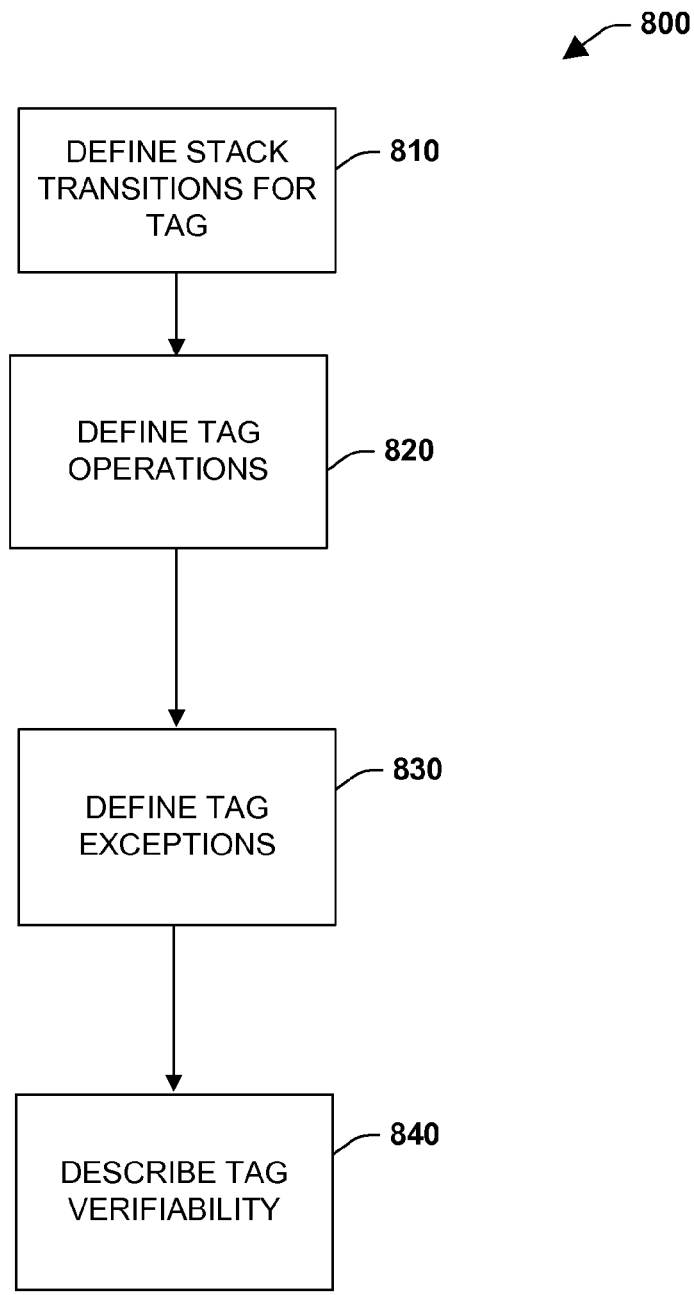
FIG. 8 is a flow diagram illustrating conversion rules from integer to tagged type in accordance with an aspect of the present invention.

At 740, Verifiability for a test class is described:
Correct CIL ensures that class is a valid typeref or typedef token indicating a class, and that obj is always either null or an object reference FIG. 8 is a diagram 800 illustrating conversion rules from integer to tagged type in accordance with an aspect of the present invention.

| tag[.ovf] - convert integer to object reference | | |
|---|---|---|
| Format | Assembly Format | Description |
| OPCODE_TAG | Tag[.ovf] | Convert integer i to a tagged object reference |

At 810, stack transitions are defined for a tag class as follows:

Stack Transition:
..., i→ ..., obj

At 820, tag is defined as follows:

The tag instruction converts an untagged value i (a native integer) into an instance of type Top (of type O). This is accomplished by setting special tag bits in i.

At 830, Exceptions for tag are described as follows:

OverflowException is thrown if value tag bits are already set.

At 840, Verifiability for tag is described:

Correct CIL ensures that i is of type native int.

Figure 9:
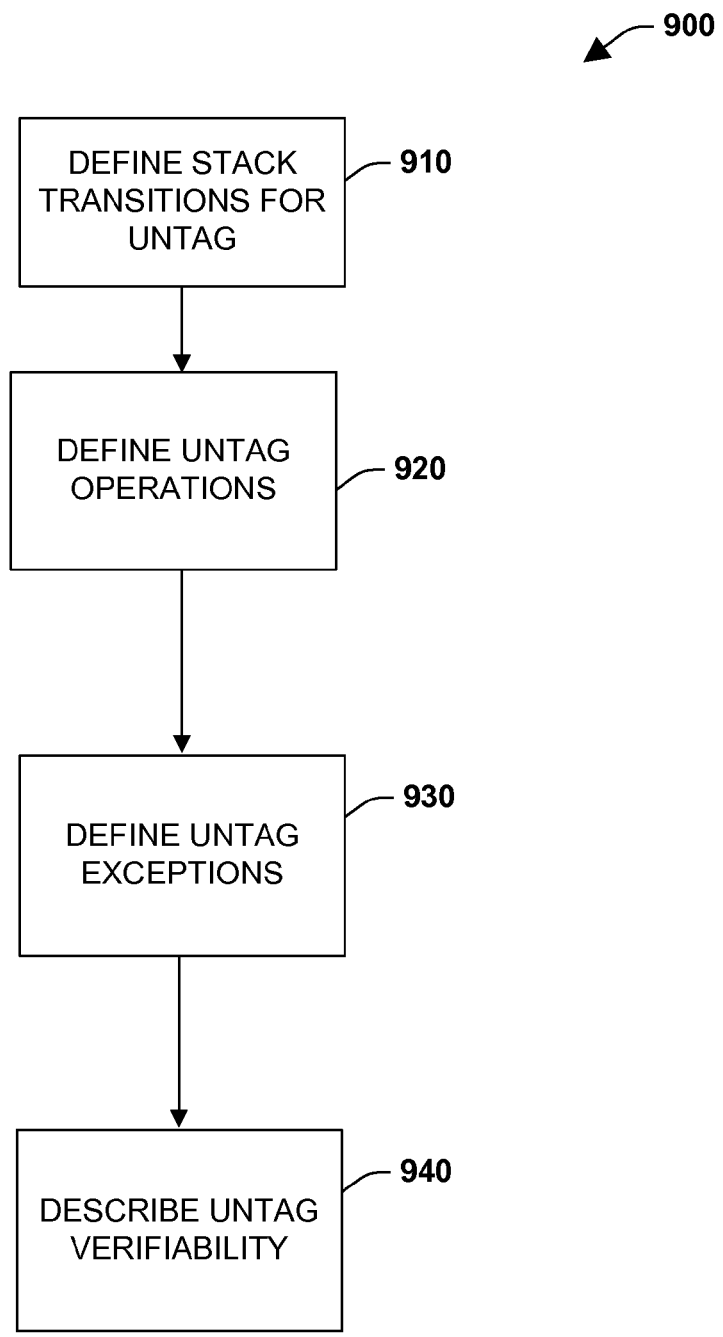
FIG. 9 is a flow diagram illustrating conversion rules from tagged type to integer in accordance with an aspect of the present invention.

FIG. 9 is a diagram 900 illustrating conversion rules from tagged type to integer in accordance with an aspect of the present invention.

| untag[.ovf] - convert object reference to integer | | |
|---|---|---|
| Format | Assembly Format | Description |
| OPCODE_UNTAG* | UnTag | Convert a tagged object reference to integer i |

*Note: The opcodes OPCODE_TAG and OPCODE_UNTAG will be allocated from a range of available CLI opcodes (see ECMA partition III, section 1.2.1).

At 910, stack transitions are defined for an untag class as follows:

Stack Transition:

..., obj → ..., i

At 920, untag is defined as follows:

The untag instruction converts a tagged object reference into a native integer. This is accomplished by un-setting special tag bits in obj.

At 930, Exceptions for untag are described as follows:

InvalidCastException is thrown if obj is not a tagged value.

NullReferenceException is thrown if obj is null.

At 940, Verifiability for untag is described:

Correct CIL ensures that obj is an object reference, i.e. of type Top, and represents a tagged integer.

Figure 10:
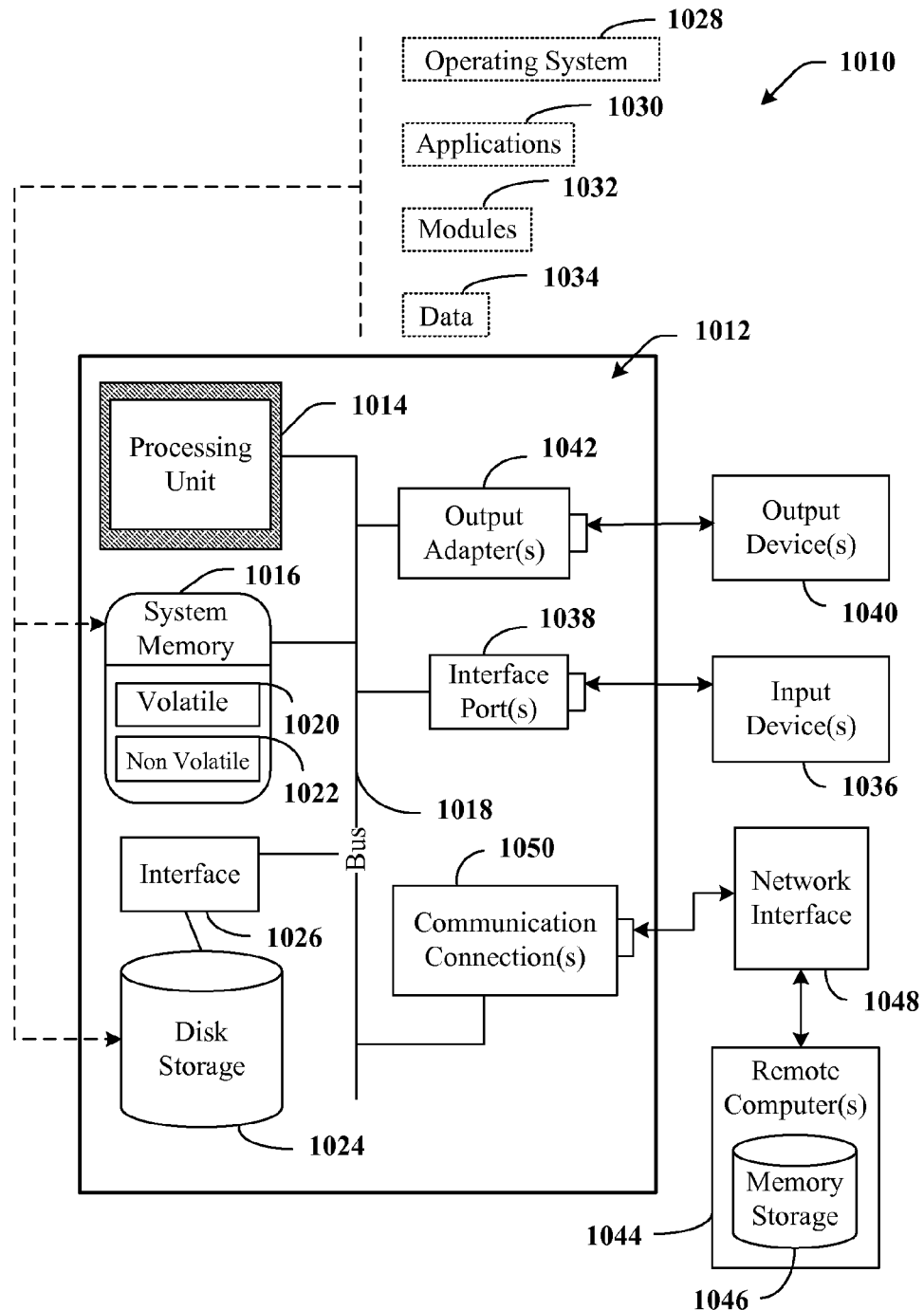
FIG. 10 is a schematic block diagram illustrating a suitable operating environment in accordance with an aspect of the present invention.

With reference to FIG. 10, an exemplary environment 1010 for implementing various aspects of the invention includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable ROM (EEPROM), or flash memory. Volatile memory 1020 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1012 also includes removable/non-removable, volatile/non-volatile computer storage media. FIG. 10 illustrates, for example a disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in suitable operating environment 1010. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that the present invention can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040, that require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

Figure 11:
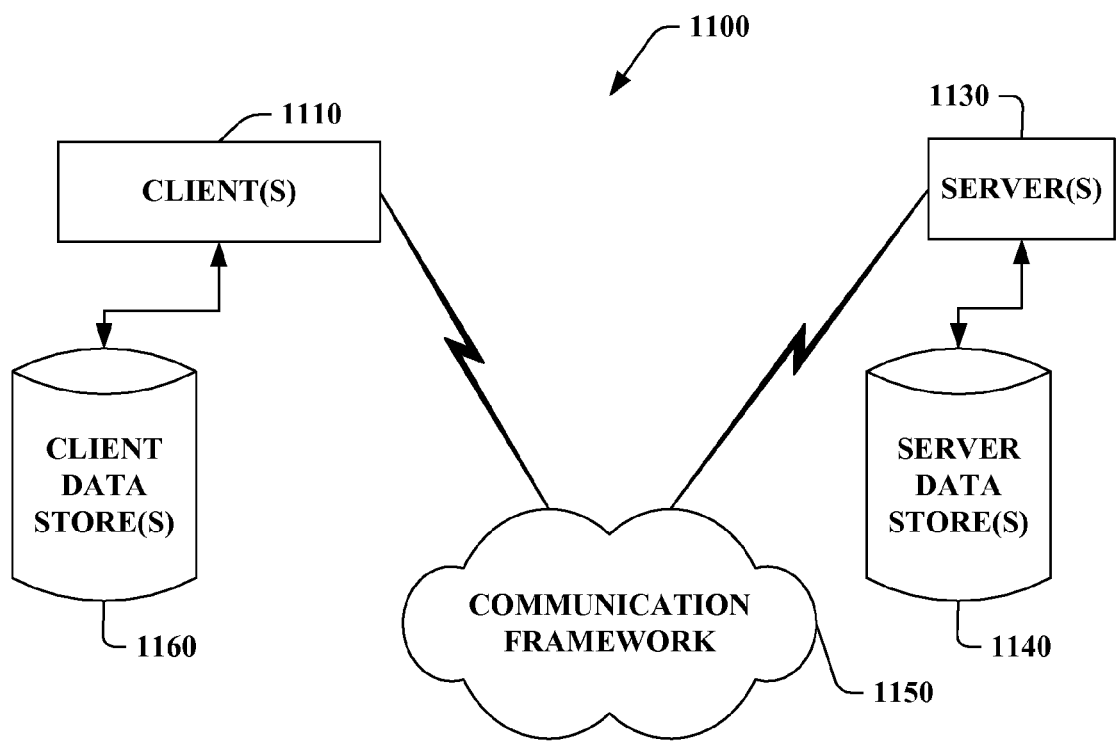
FIG. 11 is a schematic block diagram of a sample-computing environment with which the present invention can interact.

FIG. 11 is a schematic block diagram of a sample-computing environment 1100 with which the present invention can interact. The system 1100 includes one or more client(s) 1110. The client(s) 1110 can be hardware and/or software (e.g., threads, processes, computing devices). The system 1100 also includes one or more server(s) 1130. The server(s) 1130 can also be hardware and/or software (e.g., threads, processes, computing devices). The servers 1130 can house threads to perform transformations by employing the present invention, for example. One possible communication between a client 1110 and a server 1130 may be in the form of a data packet adapted to be transmitted between two or more computer processes. The system 1100 includes a communication framework 1150 that can be employed to facilitate communications between the client(s) 1110 and the server(s) 1130. The client(s) 1110 are operably connected to one or more client data store(s) 1160 that can be employed to store information local to the client(s) 1110. Similarly, the server(s) 1130 are operably connected to one or more server data store(s) 1140 that can be employed to store information local to the servers 1130.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method implemented within a computer system that includes one or more processors and memory storing instructions which, when executed by the one or more processors, implement the method for facilitating dynamic programming language execution in a managed code environment in a type-safe manner by processing tagged type values generated from dynamic programming languages in accordance with a class framework and rules, in lieu of treating the tagged values as boxed variables, the method comprising:
    an act of a computer system, which includes one or more processors, defining a bifurcated class structure in an inheritance hierarchy, which defines tagged types used by dynamic programming languages executable in a managed code environment, the bifurcated class structure comprising:
        an abstract root type class forming a root of the bifurcated class structure, which defines one or more uppermost elements of type top that represent completely opaque, natural size values;
        a sealed tagged type class that defines one or more elements of type tagged, wherein the tagged type class is nested below the root type class on a first branch in the bifurcated class structure; and
        a System.Object type class that defines non-tagged element types, wherein the System.Object type class is nested below the root type class on a second branch in the bifurcated class structure;
    an act of the computer system defining one or more metadata validation rules that disallow inheritance from top element types and tagged element types, thereby ensuring that non-tagged element types do not derive or inherit properties from tagged element types or top element types; and
    an act of a computer system executing at least one instruction for a tagged type member, while ensuring that at least one non-tagged type member does not derive or inherit properties from at least one tagged type member, in accordance with the one or more metadata validation rules.

2. The method in accordance with claim 1, wherein top element type references are not permitted as operands in arithmetic operations, but tagged element type references are permitted as operands in arithmetic operations.

3. The method in accordance with claim 1, wherein the non-tagged element types comprise user-defined element types.

4. The method in accordance with claim 1, further comprising:
    an act of the computer system defining one or more stack execution rules for processing tagged and non-tagged values.

5. The method in accordance with claim 4, wherein the stack execution rules include a cast class rule that casts an object to a class.

6. The method in accordance with claim 4, wherein the stack execution rules include a test class rule that determines whether an object is an instance of a class or interface.

7. The method in accordance with claim 4, wherein the stack execution rules include a convert integer to object reference rule that converts an integer value to an object reference.

8. The method in accordance with claim 4, wherein the stack execution rules include a convert object reference to integer rule that converts an object reference to an integer value.

9. The method of claim 1, further comprising:
    an act of the computer system converting the at least one tagged element type member to a non-tagged element type member.

10. The method of claim 1, wherein the elements of type top comprise an "ELEMENT_TYPE_TAGGED" element type, and wherein the elements of type tagged comprise an "ELEMENT_TYPE_TOP" element type, as an extension to Partition II of the ECMA Standard that defines the Common Language Infrastructure.

11. One or more computer storage devices having stored thereon computer executable instructions that, when executed by one or more processors of a computer system, implement a method for facilitating dynamic programming language execution in a managed code environment in a type-safe manner by processing tagged type values generated from dynamic programming languages in accordance with a class framework and rules, in lieu of treating the tagged values as boxed variables, the method comprising:
- instantiating a bifurcated class structure in an inheritance hierarchy, which defines tagged types used by dynamic programming languages executable in a managed code environment, the bifurcated class structure comprising:
  - an abstract root type class forming a root of the bifurcated class structure, which defines one or more uppermost elements of type top that represent completely opaque, natural size values;
  - a sealed tagged type class that defines one or more elements of type tagged, wherein the tagged type class is nested below the root type class on a first branch in the bifurcated class structure; and
  - a system object type class that defines non-tagged element types, wherein the system object type class is nested below the root type class on a second branch in the bifurcated class structure;
- accessing one or more metadata validation rules that disallow inheritance from top element types and tagged element types, thereby ensuring that non-tagged element types do not derive or inherit properties from tagged element types or top element types; and
- executing at least one instruction for a tagged type member, while ensuring that at least one non-tagged type member does not derive or inherit properties from at least one tagged type member, in accordance with the one or more metadata validation rules.

12. The computer storage devices in accordance with claim 11, wherein top element type references are not permitted as operands in arithmetic operations, but tagged element type references are permitted as operands in arithmetic operations.

13. The computer storage devices in accordance with claim 11, wherein the non-tagged element types comprise user-defined element types.

14. The computer storage devices in accordance with claim 11, further comprising:
- an act of the computer system defining one or more stack execution rules for processing tagged and non-tagged values.

15. The computer storage devices in accordance with claim 14, wherein the stack execution rules include a cast class rule that casts an object to a class.

16. The computer storage devices in accordance with claim 14, wherein the stack execution rules include a test class rule that determines whether an object is an instance of a class or interface.

17. The computer storage devices in accordance with claim 14, wherein the stack execution rules include a convert integer to object reference rule that converts an integer value to an object reference.

18. The computer storage devices in accordance with claim 14, wherein the stack execution rules include a convert object reference to integer rule that converts an object reference to an integer value.

19. The computer storage devices of claim 11, further comprising:
- an act of the computer system converting the at least one tagged element type member to a non-tagged element type member.

20. A computer system, comprising:
- one or more processors; and
- one or more computer storage devices storing executable instructions that, when executed by the one or more processors, implement a method for facilitating dynamic programming language execution in a managed code environment in a type-safe manner by processing tagged type values generated from dynamic programming languages in accordance with a class framework and rules, in lieu of treating the tagged values as boxed variables, the method comprising:
  - an act of the computer system generating a bifurcated class structure in an inheritance hierarchy, which defines tagged types used by dynamic programming languages executable in a managed code environment, the bifurcated class structure comprising:
    - an abstract root type class forming a root of the bifurcated class structure, which defines one or more uppermost elements of type top that represent completely opaque, natural size values;
    - a sealed tagged type class that defines one or more elements of type tagged, wherein the tagged type class is nested below the root type class on a first branch in the bifurcated class structure; and
    - a system object type class that defines non-tagged element types, wherein the system object type class is nested below the root type class on a second branch in the bifurcated class structure;
  - an act of the computer system identifying one or more metadata validation rules that disallow inheritance from top element types and tagged element types, thereby ensuring that non-tagged element types do not derive or inherit properties from tagged element types or top element types; and
  - an act of a computer system executing at least one instruction for a tagged type member, while ensuring that at least one non-tagged type member does not derive or inherit properties from at least one tagged type member, in accordance with the one or more metadata validation rules.

* * * * *